(12) United States Patent
Lewallen

(10) Patent No.: US 8,320,838 B2
(45) Date of Patent: *Nov. 27, 2012

(54) HOST-MOBILE TRACE SYNCHRONIZATION AND COMPARISON

(75) Inventor: Steve Lewallen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/328,174

(22) Filed: Dec. 16, 2011

(65) Prior Publication Data

US 2012/0088456 A1    Apr. 12, 2012

Related U.S. Application Data

(63) Continuation of application No. 12/397,201, filed on Mar. 3, 2009, now Pat. No. 8,081,930.

(60) Provisional application No. 61/033,749, filed on Mar. 4, 2008.

(51) Int. Cl.
*H03B 17/00* (2006.01)

(52) U.S. Cl. .................. 455/67.11; 455/67.14; 714/47.1

(58) Field of Classification Search ............... 455/67.11, 455/67.14; 709/224; 714/39, 47.1, 47.2, 714/47.3
See application file for complete search history.

(56) References Cited

U.S. PATENT DOCUMENTS

2007/0178843 A1   8/2007  Singh et al.
2007/0294399 A1  12/2007  Grossner et al.

*Primary Examiner* — An Luu
(74) *Attorney, Agent, or Firm* — Blakely, Sokoloff, Taylor & Zafman LLP

(57) ABSTRACT

Systems and methods are provided for tracing parameters indicative of performance of a mobile device that is not tethered to a host computer. The mobile device is instructed to monitor a performance characteristic when the mobile device is not tethered to the host computer. The instructions may be to trace the characteristic at a certain point, for a span in the future, under certain conditions, or at all times. When the mobile device is later tethered to the host computer, the traced parameter data is transferred to the host computer. Applications that decrease performance, as indicated by the traced parameters, may be debugged or optimized. The behavior of the mobile device before, during, and after tethering to the host computer or to a second device may be observed. The performance of a plurality of untethered mobile devices may also be traced, transferred, and compared.

20 Claims, 9 Drawing Sheets

HOST-MOBILE TRACE SYNCHRONIZATION AND COMPARISON

This application is a continuation of co-pending U.S. application Ser. No. 12/397,201, filed on Mar. 3, 2000, now U.S. Pat. No. 8,081,930, which claims priority to U.S. Provisional Patent Application No. 61/033,749, entitled, "HOST-MOBILE TRACE SYNCHRONIZATION AND COMPARISON" filed Mar. 4, 2008.

BACKGROUND

1. Field

The present invention generally relates to observing operation of a mobile device, and, more particularly, to testing the response of a mobile device to being linked to and unlinked from another device.

2. Description of Related Technology

Modern mobile devices such as media players and mobile phones utilize software in their operation. Errors or a lack of optimization in the software can cause negative device performance, for example causing the device to perform poorly, lock up, shut down, consume excess energy, or overheat. Software for mobile devices is generally developed separately from the mobile device itself, for example in integrated development environments that can be linked to the mobile device. Software can be loaded onto mobile devices prior to purchase by an end user. Such software can generally be debugged by professional developers prior to release, but end users lack effective tools for debugging software that they might later develop for the mobile device.

End user software developers typically run an integrated development environment on a development computer. The development computer can be linked to the mobile device such that applications can be transferred between the development computer and the mobile device. Applications can only be modified on the development computer, but applications can only be executed on the mobile device. The development computer may also collect real-time information about the device through the link. Thus, end users attempting to debug an application normally operate the mobile device, for example by interacting with a user interface (UI), while collecting information on the development computer. Upon encountering an error in the application, the user can look at the development computer to see whether the information is indicative of the problem. However, information about the mobile device is only gathered while the mobile device is linked to the development computer, such that the behavior of a mobile device in a normal operating state unlinked to a computer is unknown. Thus, development of applications for mobile devices can be difficult due to the complexity of various scenarios.

BRIEF DESCRIPTION OF THE DRAWINGS

These and other features, aspects, and advantages of the invention disclosed herein are described below with reference to the drawings of certain embodiments, which are intended to illustrate and not to limit the invention.

DETAILED DESCRIPTION

Systems and methods are provided for tracing parameters indicative of performance of a mobile device that is not tethered to about computer and for tracing parameters indicative of performance of a mobile device upon tethering and untethering to a host compute or another device. In certain embodiments, the mobile device may be instructed to create a message indicative of a performance characteristic when the mobile device is not tethered to the host computer. The instructions may be to trace the characteristic at a certain point, for a span in the future, under certain conditions, or at all times. Data of the traced characteristic may be stored in the memory of the mobile device. When the mobile device is later tethered to the host computer, the traced parameter information may be transferred to the host computer, where the information may be analyzed. Applications that decrease performance of the mobile device, as indicated by the traced parameters, may thereby be debugged or optimized. In some embodiments, the behavior of the mobile device before, during, and after tethering to the host computer or to a second device may be observed. The performance of a plurality of untethered mobile devices may also be traced, transferred, and compared.

Figure 1:
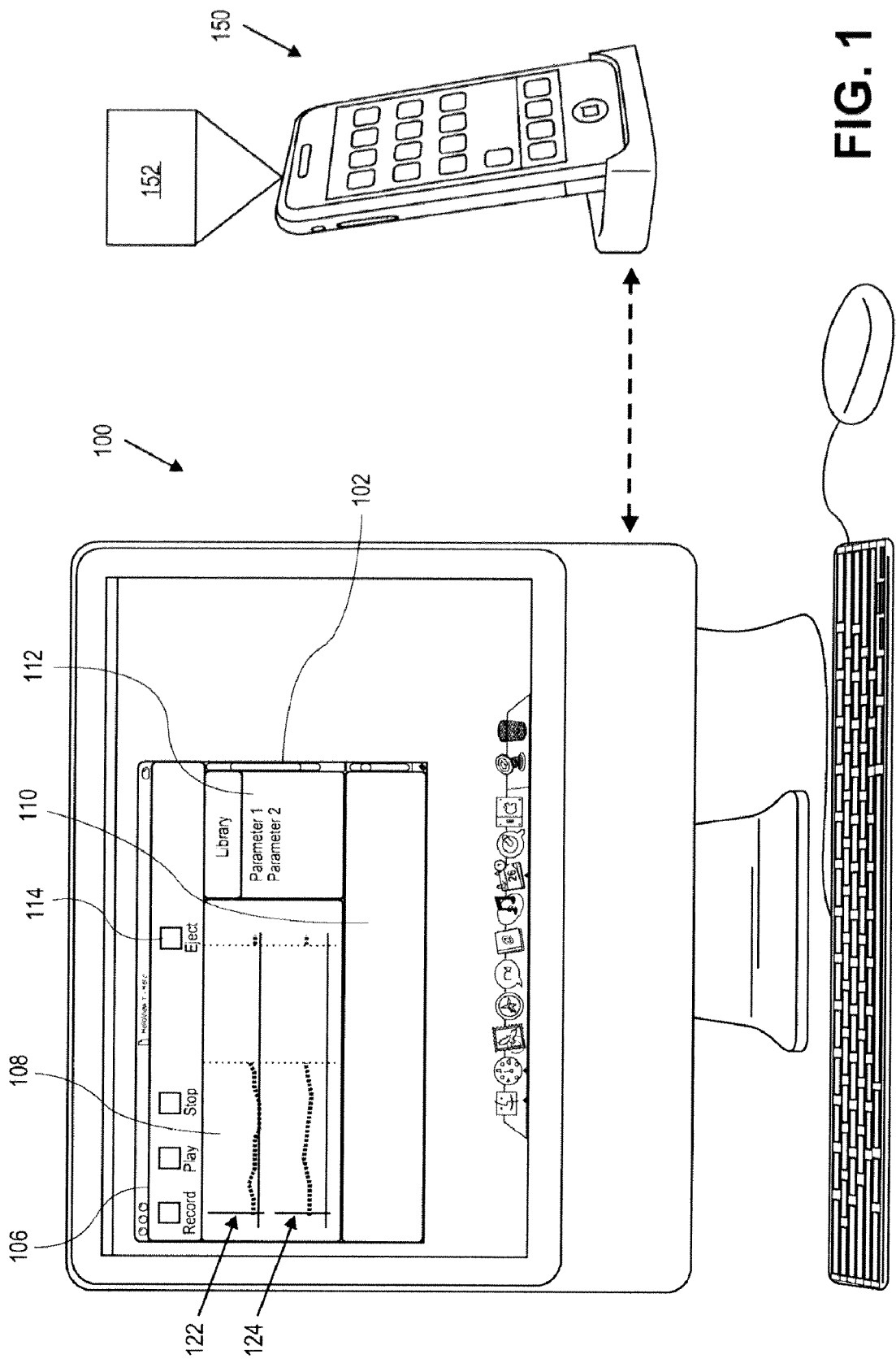
FIG. 1 illustrates an example embodiment of a system for interacting with a mobile device.

FIG. 1 illustrates host computer 100 that may be linked to mobile device 150 via tether, as indicated by the dashed arrows. As an example and without limitation, mobile device 150 may be an iPhone™, available from Apple, Inc. of Cupertino, Calif. In some embodiments, tether includes a physical wire such as a universal serial bus (USB). In some embodiments, tether includes a wireless connection such as a local area network or Bluetooth®. Host computer 100 may be executing or "running" an operating system. The operating system may be a platform for executing applications such as monitoring application 102. As an example and without limitation, monitoring application 102 may be Instruments, also available from Apple, Inc. Monitoring application 102 may include toolbar 106, graphical chart area 108, detailed view area 110, and option selection area 112. Additional, fewer, and rearranged areas are also possible. In some embodiments, a parameter from option selection area 112 may be selected for monitoring, for example by dragging and dropping the parameter into graphical chart area 108. Option selection area 112 may include a list of monitorable parameters of host computer 100 and mobile device 150. The parameters available in option selection area 112 may change depending on what kind of bile device 150 is linked to host computer 100, for example based on a tethering signature of mobile device 150.

Monitoring application 102 may be configured to collect information regarding parameters of mobile device 150. For example and without limitation, parameters that can be monitored include: load on a central processing unit (CPU), load on system memory, load on a graphics card, drive access frequency, drive access time, a log of searches, local area network packets sent and/or received, cellular network packets sent and/or received, network detection, graphics throughput, memory leakage, and power usage. The data collected may also include information about the applications being executed on mobile device 150, including which specific program instructions were being executed. Monitoring application 102 is further configured to collect information regarding parameters of host computer 100. Illustrated monitoring application 102 displays monitored parameters of mobile device 150 in graph 122 and monitored parameters of host computer 100 in graph 124, although other parameters may also be being monitored but not displayed. Upon operation of mobile device 150, the parameters of mobile device 150 monitored by the monitoring application 102 may change, foe example resulting in data that may be used to construct a line graph such as depicted in graph 122. Likewise, while tethered to mobile device 150, the parameters of the host computer 100 may change, resulting in data that may be used to construct a line graph such as depicted in graph 124. Graphs 122, 124 can be depicted in any suitable format (e.g., line chart, bar chart, integrated line chart, x-y plot, etc.), and the format may be changed within monitoring application 102. Upon untethering of mobile device 150 from host computer 100, monitoring application 102 can continue to monitor the parameters of host computer 100, but is not linked to mobile device 150 and therefore cannot monitor the parameters of mobile device 150. In graphical chart area 108 illustrated in FIG. 1, mobile device 150 was untethered, as indicated by the left dotted line and the lack of data thereafter in graph 122, and was retethered, as indicated by the right dotted line and the resumption of data thereafter in graph 122. Graphical chart area 108 also may depict a lack of data for host computer 100 while mobile device 150 was untethered, for example because there may be limited interest in the behavior of host computer 100 without being tethered to mobile device 150, although the data in graph 124 could also be continuous.

Certain embodiments of the present invention permit monitoring of parameters of mobile device 150 when mobile device 150 is not tethered to host computer 100. Parameters to be collected are coupled to trace instructions. In some embodiments, the trace instructions are selected from option selection area 112. For example and without limitation, the trace instruction can optionally be: to begin tracing a parameter at a certain time (e.g., 6:00 PM on Mar. 1, 2008); to begin tracing a parameter upon a specified event (e.g., executing or opening a particular program); to stop tracing a parameter at a certain time (e.g., 6:30 PM on Mar. 1, 2008); to stop tracing a parameter after a certain duration (e.g., 30 minutes); to stop tracing a parameter at a certain time (e.g., 6:30 PM on Mar. 1, 2008); to stop tracing a parameter upon a specified event (e.g., stopping executing or closing a particular program); and to stop tracing a parameter after a certain amount of data has been collected (e.g., after memory 152 is full, after 50 Megabytes (MB)). For another example, the trace instruction can be to continuously trace a parameter. In certain such embodiments, the continuous trace may be limited to only hold the most recent amount (e.g., 50 MB) or the most recent duration (e.g., 30 minute) worth of data. Combinations are also possible, for example continuously collecting information and collecting information at certain times and/or upon occurrence of certain events. One trace instruction can apply to one or a plurality of parameters, or may apply to all parameters. Additionally, multiple trace instructions can apply to one parameter. Referring again to FIG. 1, mobile device 150 may include memory 152 that is configured to store trace data. Accordingly, the amount of trace data that may be collected is only limited by the quantity of available storage.

In some embodiments, monitoring application 102 may include a utility or tool for instructing mobile device 150 to trace a parameter when it is not tethered to host computer 100. For example, illustrated toolbar 106 may include icon 114 configured to upload such instructions to mobile device 150. As an example, engaging icon 114 may include sending a DTrace message to mobile device 150. As another example, engaging icon 114 may include sending a Unix kernel such as "top" to mobile device 150.

When mobile device 150 is later tethered to host computer 100, trace data may be transferred from memory 152 of mobile device 150 to host computer 100. In some embodiments, the transfer may occur when monitoring application 102 is being executed. In such embodiments, monitoring application 102 may be being executed prior to tethering mobile device 150 to host computer 100. In certain embodiments, transfer may be automatic. In certain embodiments, transfer may be initiated by a user of host computer 100, for example by operation of an icon in toolbar area 106. In some embodiments, trace information man be transferred to host computer 100 without tethering mobile device 150 to host computer 100. For example, trace data may be uploaded to a server, for example over a cellular network, where it may be downloaded to host computer 100 for use by monitoring application 102. In certain such embodiments, periodically uploading trace data to the server and subsequently removing trace data from memory 152 of mobile device 150 can reduce the burden on memory 152 of mobile device 150 or can allow further tracing.

Figure 2:
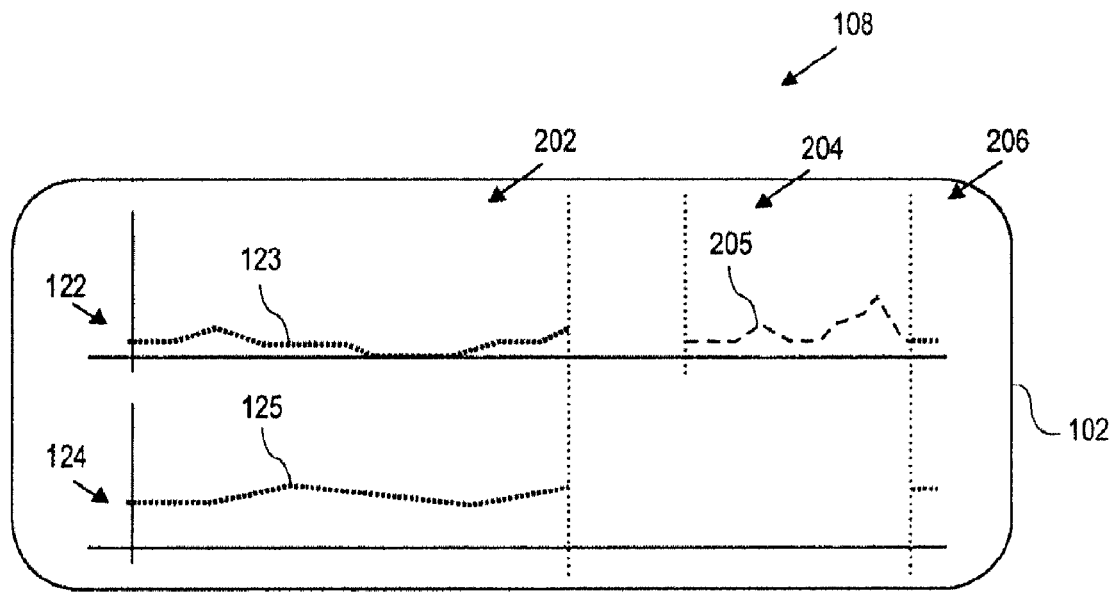
FIG. 2 illustrates an example embodiment of a system for synchronizing information collected from a mobile device.

FIG. 2 illustrates an example embodiment of graphical chart area 108 of monitoring application 102. As described above, monitoring application 102 may be configured to trace information when mobile device 150 is tethered to host computer 100. Data may be collected relatively continuously, as indicated by lines 123, 125 in graphs 122, 124, respectively. Portion 202 of graphs 122, 124 may be during an initial tethering duration or portion thereof portion 204 of graphs 122, 124 may be during a subsequent untethering duration, and portion 206 of graphs 122, 124 may be during a subsequent tethering duration. In the illustrated embodiment, the instruction from monitoring application 102 may have been to continuously trace a parameter, but to only hold the most recent duration worth of data in memory 152. Accordingly, upon tethering of mobile device 150 to host computer 100, trace data may be transferred from memory 152 to host computer 100. Monitoring application 102 then may use information about the parameter to synchronize trace data with previously and/or subsequently collected tethered data, as indicated by dashed line 205 in portion 204. Alternatively, transferred trace data may be analyzed without being synchronized to any tethered data.

In some embodiments, trace data may be used to identify problems occurring during the trace duration. For example, peaks in CPU load may indicate that launching a certain application causes mobile device 150 to run slowly or to overheat. A developer may correlate the peaks with specific events occurring during the launch process to debug or optimize those portions of the application. Such methods may be useful for applications that behave differently when mobile device 150 is not tethered to host computer 100. Such methods may also be useful for observing the behavior of mobile device 150 when it is tethered to other devices and for comparing performance of a plurality of mobile devices 150, as described below.

In embodiments in which (1) monitoring application 102 begins to monitor parameters of mobile device 150 and host computer 100 upon tethering and (2) trace data includes information about mobile device 150 immediately before tethering, reactions of both mobile device 150 and host computer 100 to tethering can be observed, as depicted in FIG. 2. In embodiments in which (1) monitoring application 102 begins to monitor parameters of mobile device 150 and host computer 100 until untethering and (2) trace data includes information about mobile device 150 immediately after untethering, reactions of both mobile device 150 and host computer 100 to untethering can be observed. These observations may be useful for mobile devices 150 that are frequently tethered, for example to optimize data transfer and data synchronization protocols.

Figure 3:
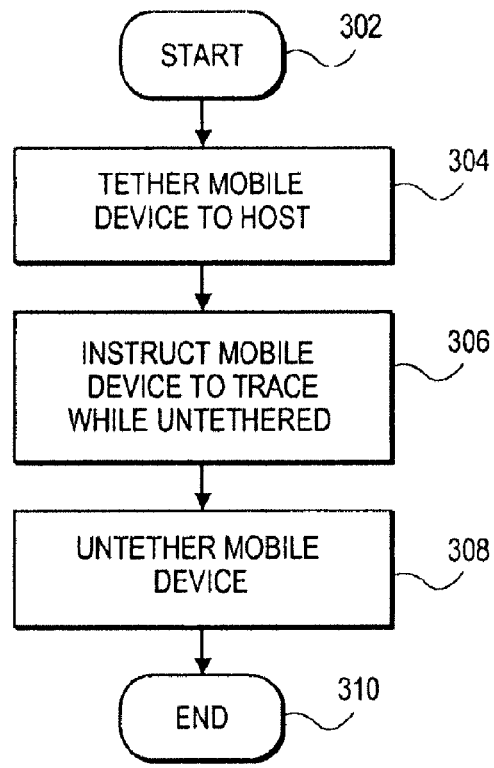
FIG. 3 illustrates an example embodiment of a method of instructing an untethered mobile device to trace information.

FIG. 3 illustrates an example embodiment of a method of instructing an untethered mobile device 150 to trace information. The method begins at box 302, labeled "Start." In box 304, mobile device 150 may be tethered to host computer 100. Host computer 100 may be executing monitoring application 102 described above. Monitoring application 102 may instruct bile device 150 to trace parameters while mobile device 150 is not tethered to host computer 100, as indicated in box 306. For example, referring to FIG. 1, icon 114 in toolbar area 106 may be engaged such that instructions for when and how to monitor particular parameters of mobile device 150 are uploaded to mobile device 150 for later execution. Once mobile device 150 has been instructed, mobile device 150 may be untethered from host computer 100 in box 308. At that point, the method of FIG. 3 may end, as indicated by box 310, labeled "End."

Figure 4:
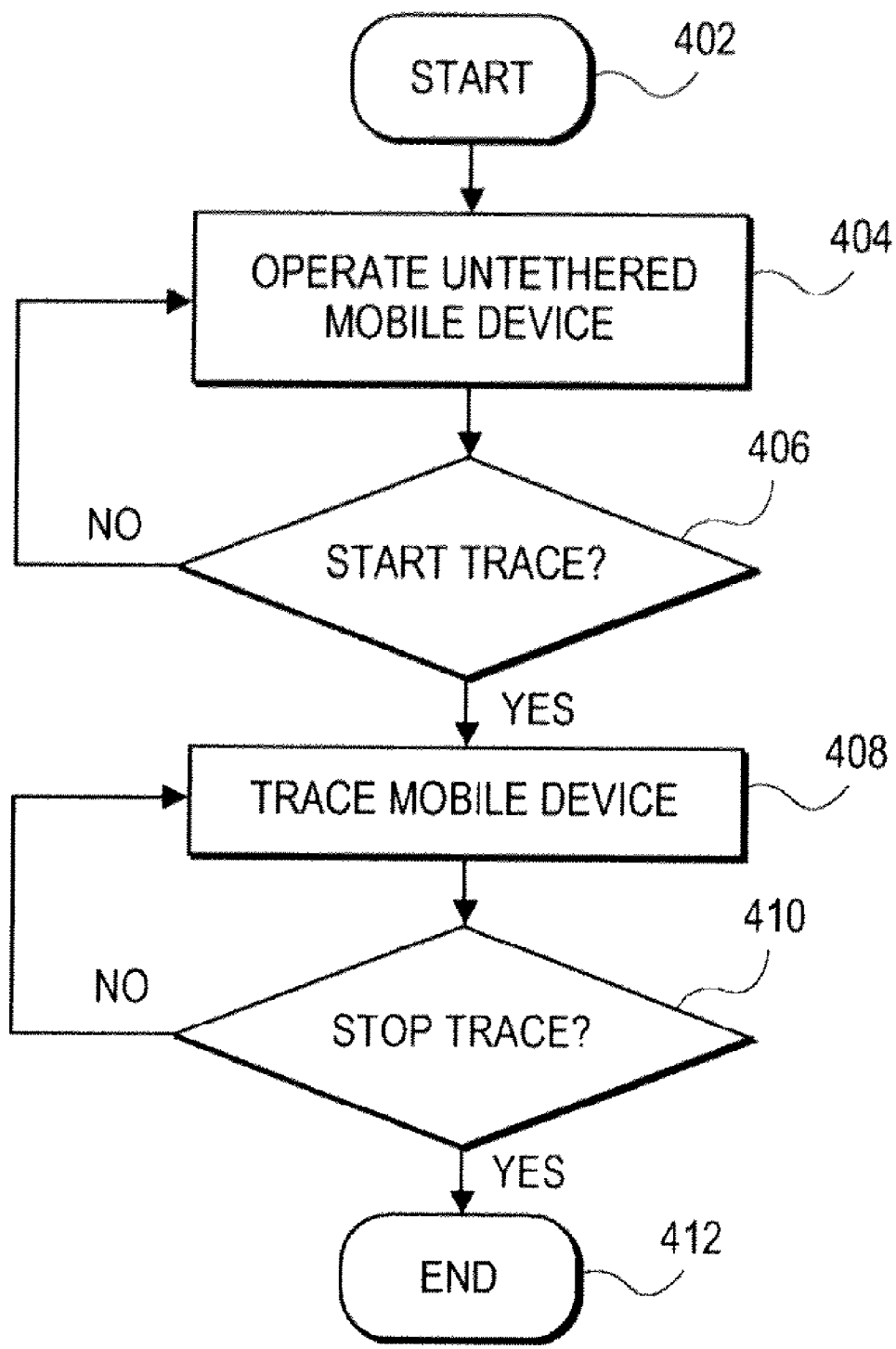
FIG. 4 illustrates an example embodiment of a method of tracing information on an untethered mobile device.

FIG. 4 illustrates an example embodiment of a method of tracing information on an untethered mobile device 150. The method begins at box 402, labeled "Start." In box 404, mobile device 150 may be operated while not tethered to host computer 100. As an example of operating mobile device 150, in an embodiment in which mobile device 150 includes a phone, the phone may be used to place calls, take pictures, play music via a media player, access a data network, etc. During operation of mobile device 150, the uploaded instruction may check to see whether tracing of a parameter should begin, as indicated by decision box 406. If the instruction is not met, mobile device 150 may continue normal operation at box 404. If the instruction is met, tracing of the parameter of mobile device 150 may begin, as indicated by box 408. As described above, initiating tracing in decision box 406 may be at a certain time, upon the occurrence of a certain event, or may be continuous such that the instruction may be met immediately upon untethering mobile device 150 from host computer 100. Referring again to box 408, operation of untethered mobile device 150 may proceed during tracing, for example because tracing may be intended to help a developer observe the behavior of an operating untethered mobile device 150. During continued operation of mobile device 150 during tracing, the uploaded instruction checks to see whether tracing of a parameter should stop, as indicated by decision box 410. If the instruction is not met, mobile device 150 may continue normal operation and tracing at box 408. If the instruction is met, tracing of the parameter of mobile device 150 may stop and the process of FIG. 4 may end, as indicated by box 412, labeled "End." As indicated above, stopping tracing the parameter of mobile device 150 may include stopping at a certain time, upon the occurrence of a certain event, after a certain duration of tracing time, after a certain amount of memory 152 has been used by the trace data, upon a tethering event, etc.

Figure 5:
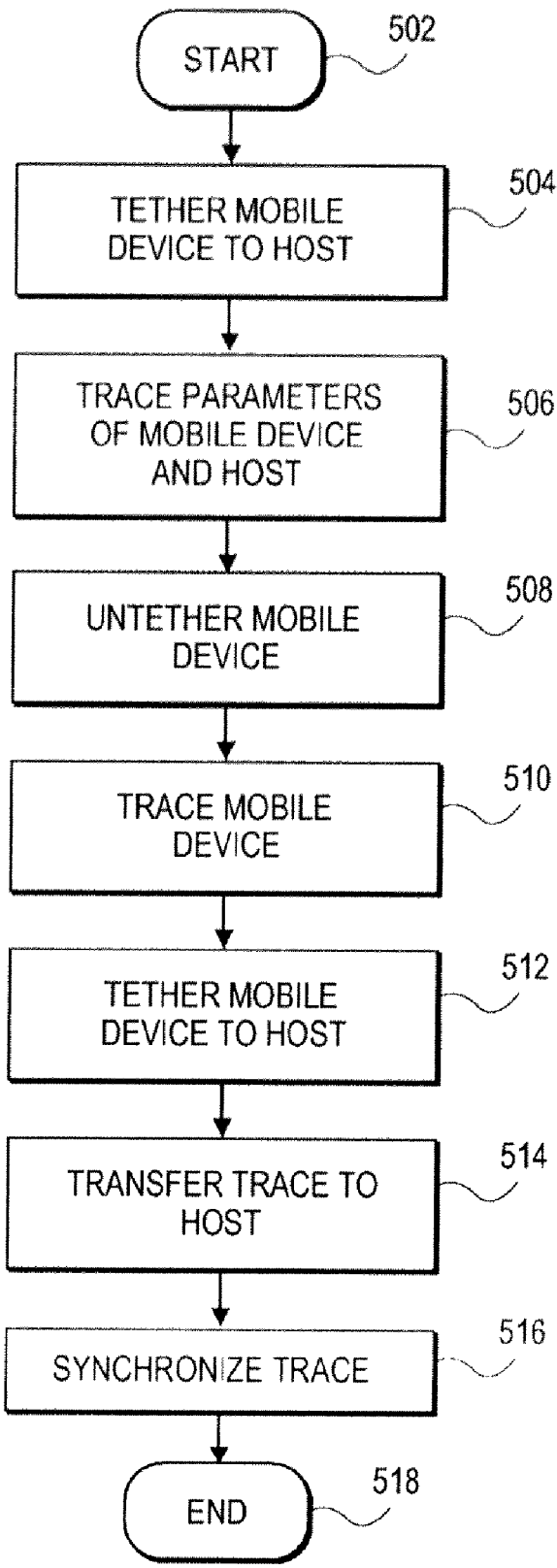
FIG. 5 illustrates an example embodiment of a method of correlating untethered mobile device trace information to tethered mobile device and host computer information.

FIG. 5 illustrates an example embodiment of a method of correlating trace information from an untethered mobile device 150 to information from a tethered mobile device 150 and host computer 100. The process begins at box 502, labeled "Start." In box 504, mobile device 150 may be tethered to host computer 100. In box 506, monitoring application 102 on host computer 100 may trace parameters of mobile device 150 and host computer 100. For example, as depicted in FIG. 2, monitoring application 102 may track a parameter of mobile device 150 in graph 122 and may track a parameter of host computer 100 in graph 124. In box 508 of FIG. 5, mobile device 150 may be untethered from host computer 100. Referring again to FIG. 2, the event of untethering mobile device 150 may end portion 202 at left vertical dotted line. After being untethered from host computer 100, mobile device 150 may collect information about the instructed parameters, as described above and depicted in box 510. Referring again to FIG. 2, collection of trace data may occur some time after untethering, as indicated by the initiation of data at shorter middle vertical dotted line in portion 204. However, data may also be collected or traced in mobile device 150 immediately upon untethering of mobile device 150 from computer 100. In box 512, mobile device 150 may again be tethered to host computer 100. In some embodiments, monitoring application 102 may begin to trace parameters of mobile device 150 and host computer 100 upon tethering. Referring again to FIG. 2, monitoring application 102 may have begun to collect information about mobile device 150 and host computer 100 immediately upon tethering in portion 206, as indicated by the initiation and continuation of data at right vertical dotted line in portion 206. Trace data collected in box 510 may then be transferred to host computer 100 in box 514. For example, transfer may be automatic upon tethering of mobile device 150 to host computer 100, or may be user initiated. Monitoring application 102 may be configured to synchronize transferred trace data to previously collected data, as indicated by box 516. Referring again to FIG. 2, monitoring application 102 may be configured to position collected data in box 510 and transferred in box 514 into portion 204 of graph 122 to create line 205. The method of FIG. 5 may end at box 518, labeled "End."

Figure 6:
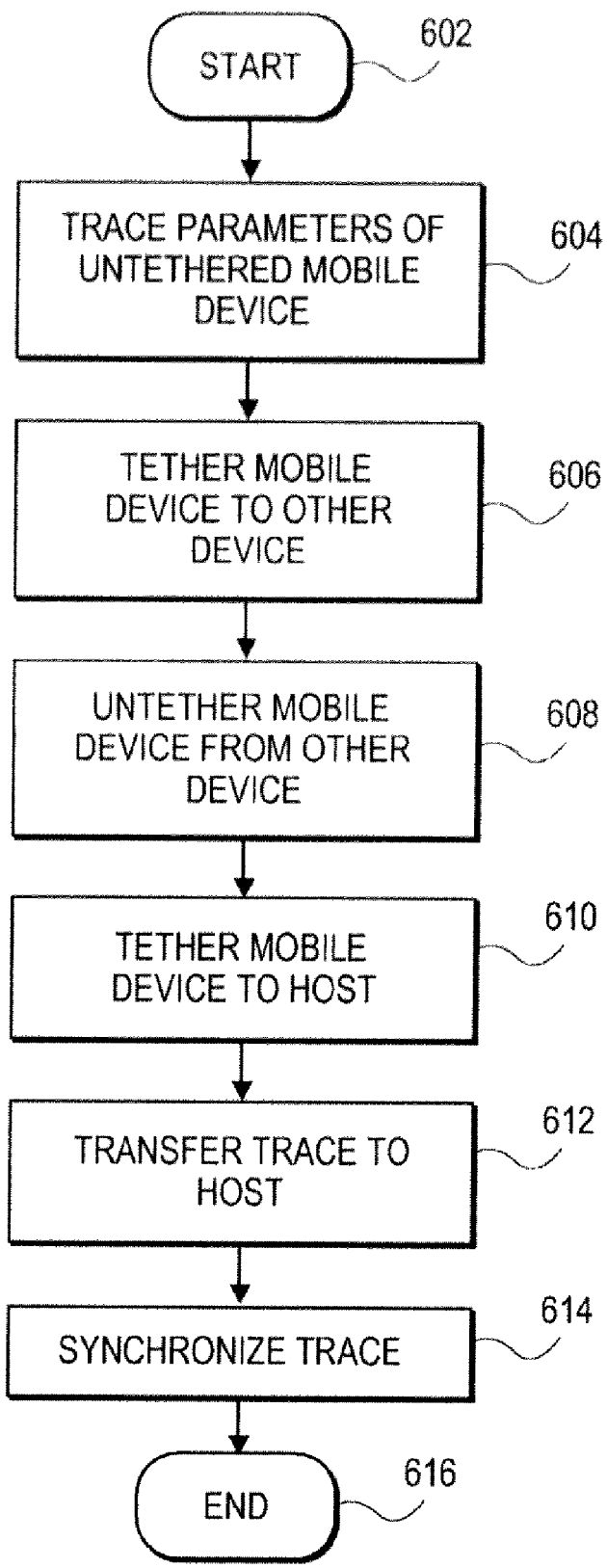
FIG. 6 illustrates an example embodiment of a method of tracing information about tethering and/or untethering of a mobile device.

FIG. 6 illustrates an example embodiment of a method of tracing information about tethering and/or untethering of mobile device 150. The method begins at box 602, labeled "Start." In box 604, an untethered mobile device 150 may trace certain parameters. During tracing, mobile device 150 may be tethered to an other device, as indicated in box 606. The other device may include a mobile device, for example being of the same kind as mobile device 150, an automobile kit, a different kind of mobile device such as a phone versus a non-phone media player, a different host computer, etc. Tethering mobile device 150 to an other device may be via a cable, a network, and the like. Mobile device 150 may then be untethered from the other device in box 608. During at least a portion of tethering of mobile device 150 to an other device in box 606 and/or during untethering of mobile device 150 from an other device in box 608, parameters of mobile device 150 may have been being traced. In box 610, mobile device 150 may be tethered to host computer 100, whereupon trace information may be transferred to host computer 100 in box 612 and synchronized in box 614, as described above. The process of FIG. 6 may end at box 616, labeled "End." In some embodiments, this method may allow a developer to observe the behavior of mobile device 150 in an environment different from mobile device 150 being tethered to host computer 100. For example, in some embodiments, it may not be possible for mobile device 150 to be tethered to both host computer 100 and an other device, such that previously the behavior of mobile device 150 upon being tethered to an other device was unknown.

Figure 7:
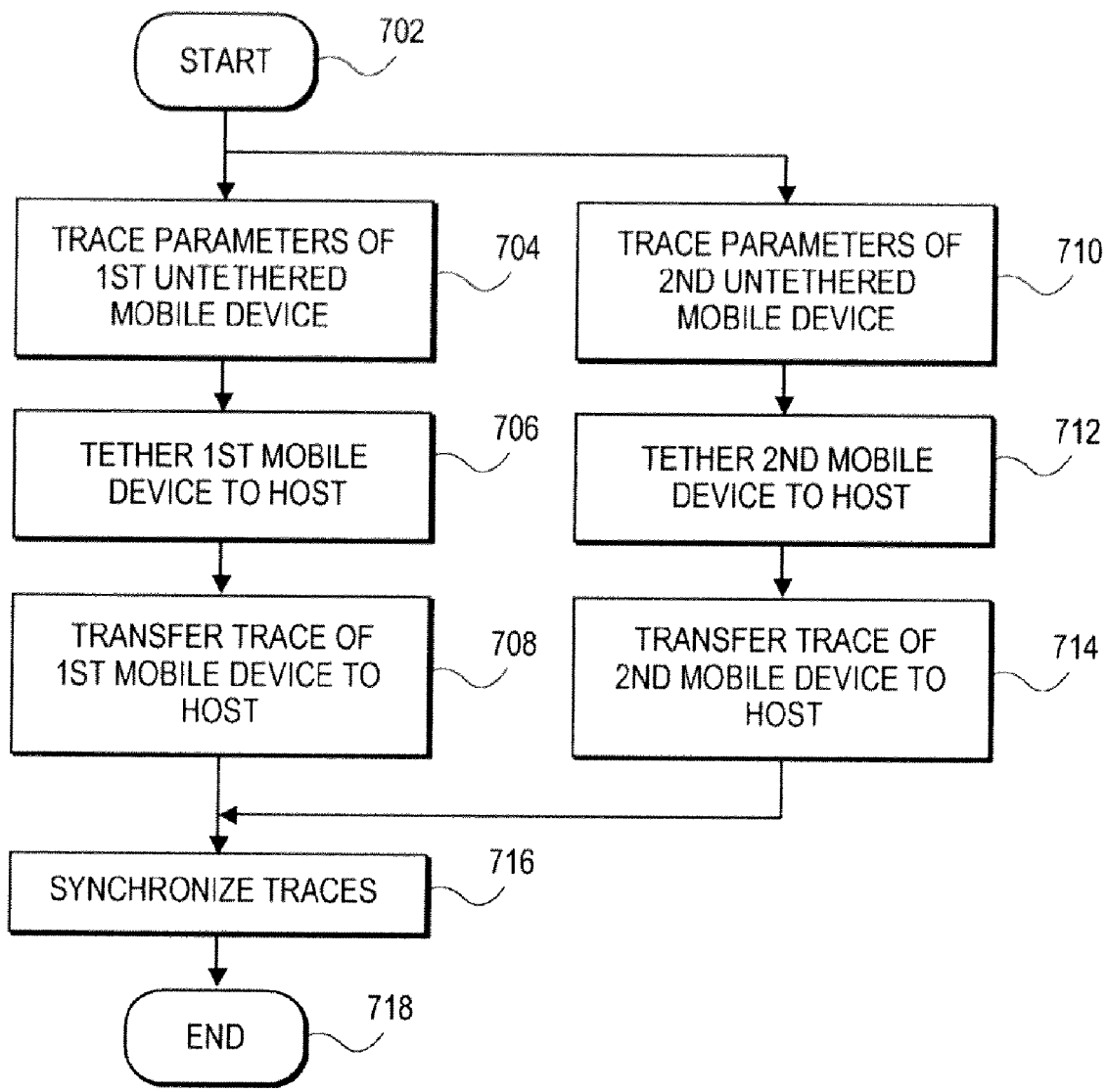
FIG. 7 illustrates an example embodiment of a method of comparing traced information about a plurality of mobile devices.

FIG. 7 illustrates an example embodiment of a method of comparing traced information from a plurality of mobile devices 150. The method begins at box 702, labeled "Start." In box 704, parameters of a first untethered mobile device 150 may be traced. First mobile device 150 may then be tethered to host computer 100 in box 706. Although not indicated in FIG. 7, tracing of parameters in mobile device 150 may be stopped prior to tethering, as described above. Trace information from mobile device 150 may be transferred to host computer 100 in box 708. Parameters may also be traced in a second untethered mobile device 150, as indicated by box 710. Second mobile device 150 may then be tethered to host computer 100 in box 712, whereupon trace information from second mobile device 150 may be transferred to host computer 100 in box 714. Operation and tethering of first and second mobile devices 150 may be at least partially in parallel, as depicted in FIG. 7, or may be in at least partially in series. In box 716, trace information from first mobile device 150 and trace information from second mobile device 150 may be synchronized. The process of FIG. 7 may end at box 718, labeled "End."

A comparison between performance of first mobile device 150 and second mobile device 150 may be made, for example, where trace information of first mobile device 150 and second mobile device 150 overlap. For example, if each trace begins upon launching of a certain application and ends upon closing of the certain application, performance of the certain application on each of first and second mobile devices 150 may be compared. Moreover, data such as other applications that may have been executed on either of first and second mobile devices 150 may be relevant to the comparison and thus also traced as part of the parameter information. First mobile device 150 and second mobile device 150 may be the same kind of mobile device or may be different kinds of mobile devices. In embodiments in which first mobile device is a different kind of mobile device than second mobile device, operation of a certain application on different types of mobile devices may be compared. For example, knowledge of how an application runs on a phone versus how an application runs on a non-phone media player may be useful.

Combinations of methods described above are also possible. For example, first mobile device and second mobile device may be tethered together, as described in the method of FIG. 6, which discusses the tethering of one mobile device to an other mobile device, and the performance of each mobile device upon that tethering and/or untethering may be compared using the method described in FIG. 7. A wide variety of possibilities are available based on the selection of which parameters to monitor and when to monitor such parameters. In some applications, parameters may be time stamped, such as by using an internal clock, a network clock, or some other timing device. In some embodiments, trace data may not be time stamped, but monitoring app cation 102 may determine when the event likely occurred based on the instruction uploaded to mobile device 150. For example, if host computer 100 instructed mobile device 150 to start monitoring the parameter data at 6:00 PM on Mar. 1, 2008, then no time stamp may be needed as monitoring application 102 may assume that the trace properly initiated. However, adding a stamp to check for the accuracy of the initiation of the trace is also possible.

Figure 8A:
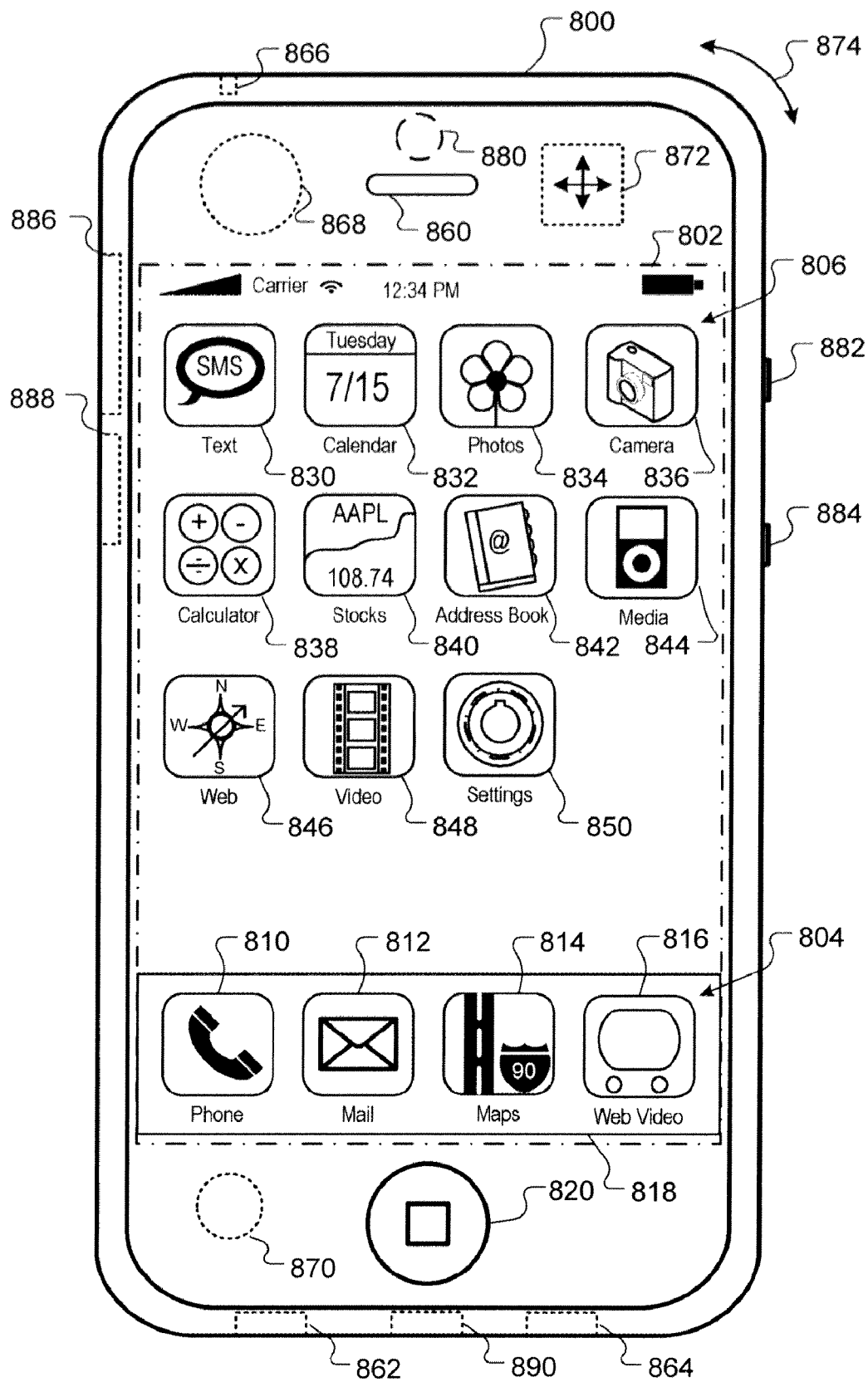
FIG. 8A illustrates an example embodiment of a mobile device.

FIG. 8A illustrates an example mobile device 800. Mobile device 800 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, mobile device 800 includes touch-sensitive display 802. Touch-sensitive display 802 can be implemented with liquid crystal display (LCD) technology, light emitting polymer display (LPD) technology, or some other display technology. Touch-sensitive display 802 can be sensitive to haptic and/or tactile contact with a user.

In some implementations, touch-sensitive display 802 can include multi-touch-sensitive display 802. Multi-touch-sensitive display 802 can, for example, process multiple simultaneous touch points, including processing data related to the pressure, degree, and/or position of each touch point. Such processing may facilitate gestures and interactions with multiple fingers, chording, and other interactions. Other touch-sensitive display technologies can also be used (e.g., a display in which contact is made using a stylus or other pointing device). Some examples of multi-touch-sensitive display technology are described in U.S. Pat. Nos. 6,323,846, 6,570,557, 6,677,932, and 6,888,536, each of which is incorporated by reference herein in its entirety.

In some implementations, mobile device 800 can display one or more graphical user interfaces on touch-sensitive display 802 for providing the user access to various system objects and for conveying information to the user. In some implementations, the graphical user interface can include one or more display objects 804, 806. In the example shown, display objects 804, 806 are graphic representations of system objects. Some examples of system objects include device functions, applications, windows, files, alerts, events, or other identifiable system objects.

Example Mobile Device Functionality

In some implementations, mobile device 800 can implement multiple device functionalities, such as a telephony device, as indicated by Phone object 810; an e-mail device, as indicated by Mail object 812; a map device, as indicated by Maps object 814; a Wi-Fi base station device (not shown); and a network video transmission and display device, as indicated by Web Video object 816. In some implementations, particular display objects 804 (e.g., Phone object 810, Mail object 812, Maps object 814, and Web Video object 816) can be displayed in menu bar 818. In some implementations, device functionalities can be accessed from a top-level graphical user interface, such as the graphical user interface illustrated in FIG. 8A. Touching one of objects 810, 812, 814, or 816 can, for example, invoke a corresponding functionality.

In some implementations, mobile device 800 can implement a network distribution functionality. For example, the functionality can enable the user to take mobile device 800 and provide access to its associated network while traveling. In particular, mobile device 800 can extend Internet access (e.g., Wi-Fi) to other wireless devices in the vicinity. For example, mobile device 800 can be configured as a base station for one or more devices. As such, mobile device 800 can grant or deny network access to other wireless devices.

In some implementations, upon invocation of a device functionality, the graphical user interface of mobile device 800 can change, or can be augmented or replaced with another user interface or user interface elements to facilitate user access to particular functions associated with the corresponding device functionality. For example, in response to a user touching Phone object 810, the graphical user interface of touch-sensitive display 802 may present display objects related to various phone functions. Likewise, touching of Mail object 812 may cause the graphical user interface to present display objects related to various e-mail functions, touching Maps object 814 may cause the graphical user interface to present display objects related to various maps functions, and touching Web Video object 816 may cause the graphical user interface to present display objects related to various web video functions.

In some implementations, the top-level graphical user interface environment or state of FIG. 8A can be restored by pressing button 820 located near the bottom of mobile device 800. In some implementations, each corresponding device functionality may have corresponding "home" display objects displayed on touch-sensitive display 802, and the graph use interface environment of FIG. 8A can be restored by pressing the "home" display object.

In some implementations, the top-level graphical user interface can include additional display objects 806, such as short messaging service (SMS) object 830, Calendar object 832, Photos object 834, Camera object 836, Calculator object 838, Stocks object 840, Address Book object 842, Media object 844, Web object 846, Video object 848, Settings object 850, and Notes object (not shown). Touching SMS display object 830 can, for example, invoke an SMS messaging environment and supporting functionality; likewise, each selection of display object 832, 834, 836, 838, 840, 842, 844, 846, 848, 850 can invoke a corresponding object environment and functionality.

Additional and/or different display objects can also be displayed in the graphical user interface of FIG. 8A. For example, if mobile device 800 is functioning as a base station for other devices, one or more "connection" objects may appear in the graphical user interface to indicate the connection. In some implementations, display objects 806 can be configured by a user, e.g., a user may specify which display objects 806 are displayed, and/or may download additional applications or other software that provides other functionalities and corresponding display objects.

In some implementations, mobile device 800 can include one or more input/output (I/O) devices and/or sensor devices. For example, speaker 860 and microphone 862 can be included to facilitate voice-enabled functionalities, such as phone and voice mail functions. In some implementations, up/down button 884 for volume control of speaker 860 and microphone 862 can be included. Mobile device 800 can also include on/off button 882 for a ring indicator of incoming phone calls. In some implementations, loud speaker 864 can be included to facilitate hands-free voice functionalities, such as speaker phone functions. Audio jack 866 can also be included for use of headphones and/or microphone.

In some implementations, proximity sensor 868 can be included to facilitate the detection of the user positioning mobile device 800 proximate to the user's car and, in response, to disengage touch-sensitive display 802 to prevent accidental function invocations. In some implementations, touch-sensitive display 802 can be turned off to conserve additional power when mobile device 800 is proximate to the user's car.

Other sensors can also be used. For example, in some implementations, ambient light sensor 870 can be utilized to facilitate adjusting brightness of touch-sensitive display 802. In some implementations, accelerometer 872 can be utilized to detect movement of mobile device 800, as indicated by directional arrow 874. Accordingly, display objects and/or media can be presented according to a detected orientation (e.g., portrait or landscape). In some implementations, mobile device 800 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into mobile device 800 or provided as a separate device that can be coupled to mobile device 800 through an interface (e.g., port device 890) to provide access to location-based services.

In some implementations, port device 890 (e.g., a Universal Serial Bus (USB) port, or a docking port, or some other wired port connection) can be included. Port device 890 can, for example, be utilized to establish a wired connection to other computing devices, such as other mobile devices 800, network access devices, a personal computer, a printer, a display screen, or other processing devices capable of receiving and/or transmitting data. In some implementations, port device 890 allows mobile device 800 to synchronize with a host device using one or more protocols, such as, for example, the TCP/IP, HTTP, UDP and any other known protocol.

Mobile device 800 can also include camera lens and sensor 880. In some implementations, camera lens and sensor 880 can be located on the back surface of mobile device 800. The camera can capture still images and/or video.

Mobile device 800 can also include one or more wireless communication subsystems, such as 802.11b/g communication device 886, and/or Bluetooth™ communication device 888. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

Figure 8B:
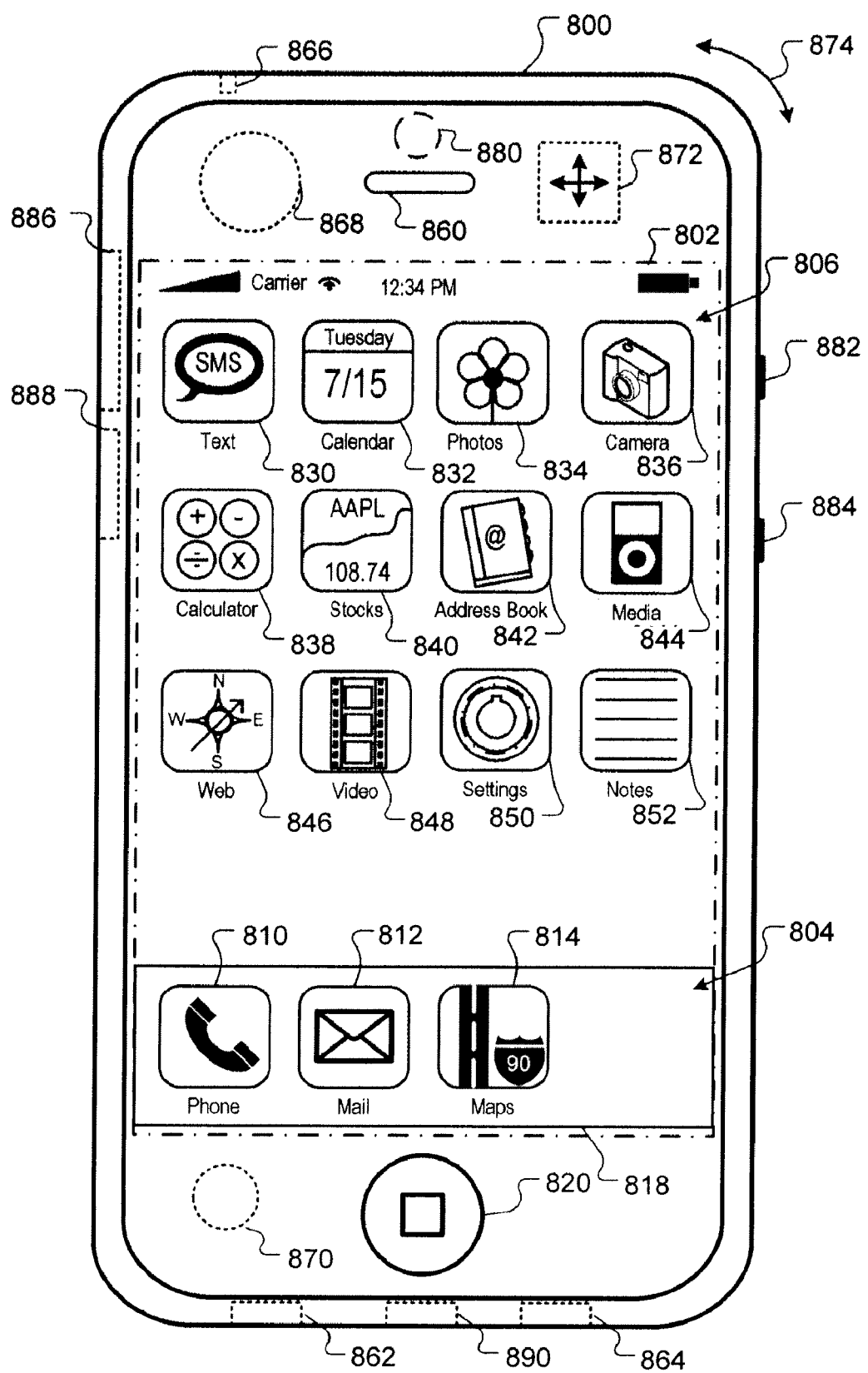
FIG. 8B illustrates an example embodiment of a configurable top-level graphical user interface of a mobile device.

FIG. 8B illustrates another example of configurable top-level graphical user interface of mobile device 800. Mobile device 800 can be configured to display a different set of display objects.

In some implementations, each of one or more system objects of mobile device 800 has a set of system object attributes associated with it; and one of the attributes determines whether a display object for the system object will be rendered in the top-level graphical user interface. This attribute can be set by the system automatically, or by a user through certain programs or system functionalities as described below. FIG. 8B shows an example of how Notes object 852 (not shown in FIG. 8A) is added to, and Web Video object 816 is removed from, the top graphical user interface of mobile device 800 (e.g., such as when the attributes of the Notes system object and the Web Video system object are modified).

Example Mobile Device Architecture

Figure 9:
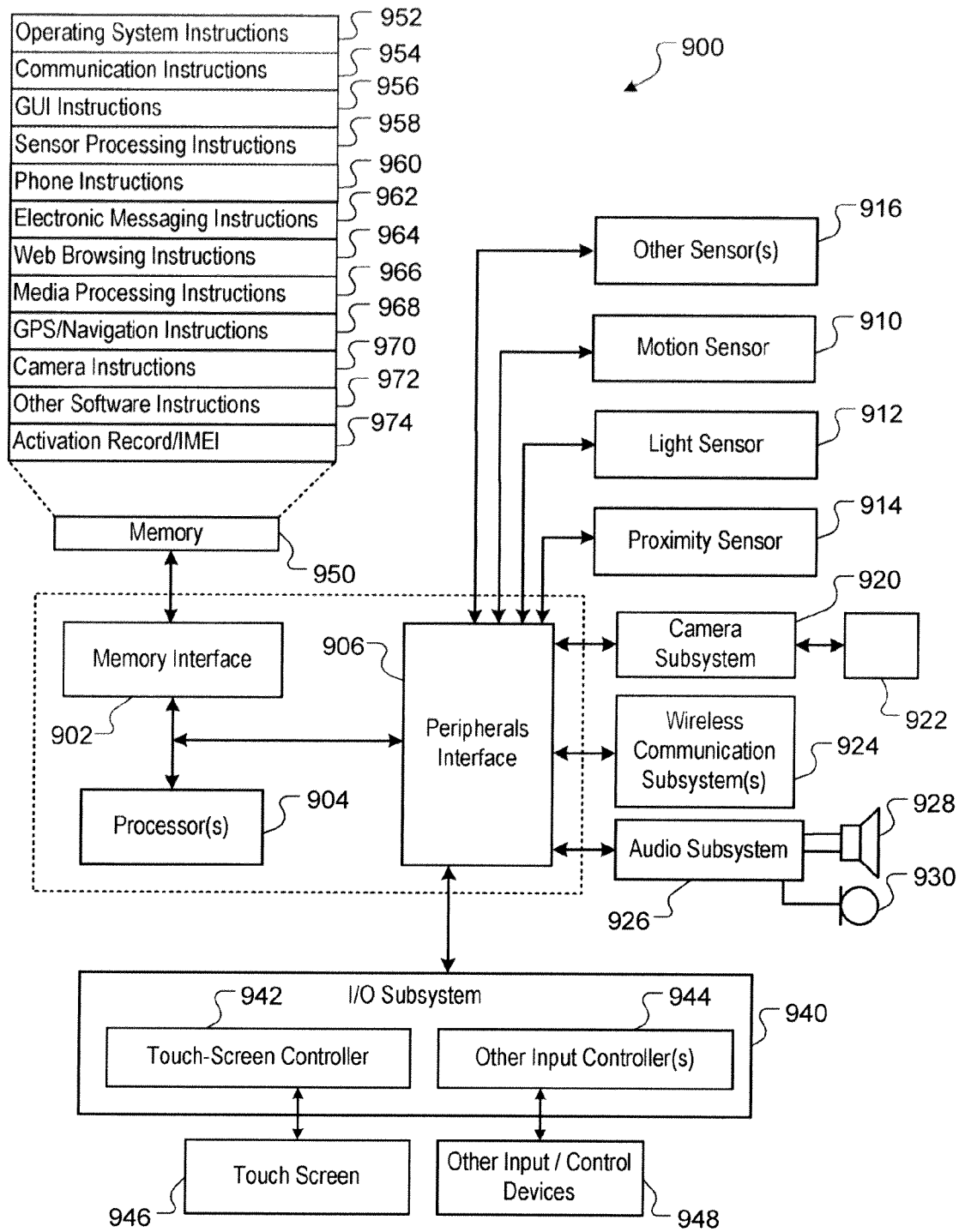
FIG. 9 is a block diagram of an example implementation of a mobile device.

FIG. 9 is a block diagram 900 of an example implementation of a mobile device e.g., mobile device 800). The mobile device can include memory interface 902, one or more data processors, image processors and/or central processing units 904, and peripherals interface 906. Memory interface 902, one or more processors 904 and/or peripherals interface 906 can be separate components or can be integrated in one or more integrated circuits. The various components in the mobile device can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate the orientation, lighting, and proximity functions described with respect to FIG. 8A. Other sensors 916 can also be connected to peripherals interface 906, such as a positioning system (e.g., GPS receiver), a temperature sensor, a biometric sensor, or other sensing device, to facilitate related functionalities.

Camera subsystem 920 and optical sensor 922 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of communication subsystem 924 can depend on the communication network(s) over which the mobile device is intended to operate. For example, a mobile device can include communication subsystems 924 designed to operate over a GSM network, a GPRS network, an EDGE network, a Wi-Fi or WiMax network, and a Bluetooth™ network. In particular, wireless communication subsystems 924 may include hosting protocols such that the mobile device may be configured as a base station for other wireless devices.

Audio subsystem 926 can be coupled to speaker 928 and microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to touch screen 946. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of touch screen 946, and a pressing of the button for a second duration that is longer than the first duration may turn power to the mobile device on or off. The user may be able to customize a functionality of one or more of the buttons. Touch screen 946 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can be a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; and/or other software instructions 972 to facilitate other processes and functions (e.g., access control management functions). Memory 950 may also store other software instructions (not shown), such as web video instructions to facilitate web video-related processes and functions and/or web shopping instructions to facilitate web shopping-related processes and functions. In some implementations, media processing instructions 966 may be divided into audio processing instructions and video processing instructions, for example to facilitate audio processing-related processes and functions and video processing-related processes and functions, respectively. Activation record and International Mobile Equipment Identity (IMEI) 974 or similar hardware identifier can also be stored in memory 950.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above.

What is claimed is:

1. An article comprising a computer-readable medium having executable instructions that, when executed, cause or fore processors to:
   monitor, with a monitoring application on a host electronic device, a parameter associated with execution of an application on a mobile electronic device when the mobile electronic device is tethered to the host electronic device, the application having previously been installed on the mobile electronic device;
   transmit instructions to the mobile electronic device to cause the mobile electronic device to monitor the parameter when the mobile electronic device is not tethered to the host electronic device;
   synchronize, automatically in response to tethering the mobile electronic device with the host electronic device, data corresponding to monitoring the parameter while the mobile device was not tethered to the host electronic device with data corresponding to monitoring the parameter while tethered to the host electronic device;
   store information about the synchronized data.

2. The article of claim 1 wherein the parameter comprises power usage of the mobile electronic device and wherein the mobile device is tethered to the host electronic device through a wireless connection or a wired connection.

3. The article of claim 1 wherein the parameter comprises at least one of: processor load, system memory load and graphics load.

4. The article of claim 1 wherein the parameter comprises at least one of: local area network packets sent/received, cellular network packets sent/received and network detection.

5. The article of claim 1 wherein instructing the mobile electronic device to monitor the parameter when the mobile electronic device is not tethered to the host electronic device comprises providing a trace instruction to the mobile electronic device to indicate one or more conditions in response to which monitoring will begin.

6. An article comprising a computer-readable medium having instructions that, when executed, cause one or more processors to:
   execute an application on a mobile electronic device;
   provide data to a monitoring application on the host electronic device corresponding to a parameter associated with execution of the application on the mobile electronic device when the mobile electronic device is tethered to the host electronic device;
   receive an instruction to cause the mobile electronic device to monitor the parameter when the mobile electronic device is not tethered to the host electronic device;
   monitor the parameter during execution of the application while the mobile device is not tethered to the host electronic device;
   transmit, automatically in response to tethering the mobile electronic device with the host electronic device, data corresponding to monitoring the parameter while the mobile device was not tethered to the host electronic device.

7. The article of claim 6 wherein the parameter comprises power usage of the mobile electronic device and wherein the mobile device is tethered to the host electronic device through a wireless connection or a wired connection.

8. The article of claim 6 wherein the parameter comprises at least one of: processor load, system memory load and graphics load.

9. The article of claim 6 wherein the parameter comprises at least one of: local area network packets sent/received, cellular network packets sent/received and network detection.

10. The article of claim 6 wherein instructing the mobile electronic device to monitor the parameter when the mobile electronic device is not tethered to the host electronic device comprises providing a trace instruction to the mobile electronic device to indicate one or more conditions in response to which monitoring will begin.

11. A method performed by a data processing system, the method comprising:
   monitoring, with a monitoring application on a host electronic device, a parameter associated with execution of an application on a mobile electronic device when the mobile electronic device is tethered to the host electronic device, the application having previously been installed on the mobile electronic device;
   transmitting instructions to the mobile electronic device to cause the mobile electronic device to monitor the parameter when the mobile electronic device is not tethered to the host electronic device;
   synchronizing, automatically in response to tethering the mobile electronic device with the host electronic device, data corresponding to monitoring the parameter while the mobile device was not tethered to the host electronic device with data corresponding to monitoring the parameter while tethered to the host electronic device;
   storing information about the synchronized data.

12. The method of claim 11 wherein the parameter comprises power usage of the mobile electronic device and wherein the mobile device is tethered to the host electronic device through a wireless connection or a wired connection.

13. The method of claim 11 wherein the parameter comprises at least one of: processor load, system memory load and graphics load.

14. The method of claim 11 wherein the parameter comprises at least one of: local area network packets sent/received, cellular network packets sent/received and network detection.

15. The method of claim 11 wherein instructing the mobile electronic device to monitor the parameter when the mobile electronic device is not tethered to the host electronic device comprises providing a trace instruction to the mobile electronic device to indicate one or more conditions in response to which monitoring will begin.

16. A method performed by a data processing system, the method comprising:
   executing an application on a mobile electronic device;
   providing data to a monitoring application on a host electronic device corresponding to a parameter associated with execution of the application on a mobile electronic device when the mobile electronic device is tethered to the host electronic device;
   receiving an instruction to cause the mobile electronic device to monitor the parameter when the mobile electronic device is not tethered to the host electronic device;
   monitoring the parameter during execution of the application while the mobile device is not tethered to the host electronic device;
   transmitting, automatically in response to tethering the mobile electronic device with the host electronic device, data corresponding to monitoring the parameter while the mobile device was not tethered to the host electronic device.

17. The method of claim 16 wherein the parameter comprises power usage of the mobile electronic device and wherein the mobile device is tethered to the host electronic device through a wireless connection or a wired connection.

18. The method of claim 16 wherein the parameter comprises at least one of: processor load, system memory load and graphics load.

19. The method of claim 16 wherein the parameter rises at least one of: local area network packets sent/received, cellular network packets sent/received and network detection.

20. The method of claim 16 wherein instructing the mobile electronic device to monitor the parameter when the mobile electronic device is not tethered to the host electronic device comprises providing a trace instruction to the mobile electronic device to indicate one or more conditions in response to which monitoring will begin.

* * * * *